(12) United States Patent
Fleisher et al.

(10) Patent No.: US 7,123,185 B2
(45) Date of Patent: Oct. 17, 2006

(54) ENHANCED SURVEILLED SUBJECT IMAGING

(75) Inventors: Michael Fleisher, Sunnyvale, CA (US); Raymond R. Blasing, Los Altos, CA (US); Maya M. Radzinski, Palo Alto, CA (US); Thomas W. Grudkowski, Pleasanton, CA (US)

(73) Assignee: SafeView, Inc., Santa Clara, CA (US)

( * ) Notice: Subject to any disclaimer, the term of this patent is extended or adjusted under 35 U.S.C. 154(b) by 359 days.

(21) Appl. No.: 10/824,875

(22) Filed: Apr. 14, 2004

(65) Prior Publication Data

US 2005/0231421 A1 Oct. 20, 2005

(51) Int. Cl.
*G01S 13/88* (2006.01)
*G01S 13/89* (2006.01)

(52) U.S. Cl. ............... 342/179; 342/22; 342/27

(58) Field of Classification Search ........... 342/22, 342/27, 42, 44, 179; 340/568.1; 250/358.1
See application file for complete search history.

(56) References Cited

U.S. PATENT DOCUMENTS

| | | |
|---|---|---|
| 4,866,424 A | 9/1989 | Parks |
| 4,901,084 A | 2/1990 | Huguenin et al. |
| 4,910,523 A | 3/1990 | Huguenin et al. |
| 4,940,986 A | 7/1990 | Huguenin |
| 5,047,783 A | 9/1991 | Hugenin |
| 5,073,782 A | 12/1991 | Huguenin et al. |
| 5,170,169 A | 12/1992 | Stephan |
| 5,202,692 A | 4/1993 | Huguenin et al. |
| 5,227,800 A | 7/1993 | Huguenin et al. |
| 5,367,552 A | 11/1994 | Peschmann |
| 5,455,590 A | 10/1995 | Collins et al. |
| 5,557,283 A | 9/1996 | Sheen et al. |
| 5,600,303 A | 2/1997 | Husseiny et al. |
| 5,760,397 A | 6/1998 | Huguenin et al. |
| 5,859,609 A | 1/1999 | Sheen et al. |
| 6,057,761 A | 5/2000 | Yukl |
| 6,078,047 A | 6/2000 | Mittleman et al. |
| 6,088,423 A | 7/2000 | Krug et al. |
| 6,094,472 A | 7/2000 | Smith |
| 6,342,696 B1 | 1/2002 | Chadwick |

(Continued)

OTHER PUBLICATIONS

U.S. Appl. No. 10/697,965, filed Oct. 30, 2003.

(Continued)

*Primary Examiner*—Thomas H. Tarcza
*Assistant Examiner*—Isam Alsomiri
(74) *Attorney, Agent, or Firm*—Kolisch Hartwell, PC

(57) ABSTRACT

An imaging system can include an antenna apparatus configured to transmit toward and receive from a subject in a subject position, millimeter-wave electromagnetic radiation. A subject may include a person and any object or objects with the person. A controller can include a transceiver configured to operate the antenna apparatus and produce an output representative of the received radiation, and a processor adapted to produce from the transceiver output, image data representative of an image of the subject. At least a first portion of an image signal representative of radiation received by an antenna apparatus may be used to produce first image data representative of a first image of at least a portion of the subject. Second image data representative of a second image having resolution that is different than that of the first image may be produced from at least a second portion of the image signal.

58 Claims, 9 Drawing Sheets

U.S. PATENT DOCUMENTS

| | | |
|---|---|---|
| 6,469,624 B1 | 10/2002 | Whan et al. |
| 6,507,309 B1 | 1/2003 | McMakin et al. |
| 6,518,915 B1 | 2/2003 | Schutz et al. |
| 6,665,373 B1 | 12/2003 | Kotowski et al. |
| 6,747,592 B1* | 6/2004 | Nakamura .................. 342/70 |
| 6,791,487 B1 | 9/2004 | Singh et al. |
| 6,927,691 B1* | 8/2005 | Yukl ....................... 340/568.1 |
| 7,023,376 B1* | 4/2006 | Kuroda et al. ............. 342/70 |

OTHER PUBLICATIONS

U.S. Appl. No. 10/697,848, filed Oct. 30, 2003.
U.S. Appl. No. 10/607,552, filed Jun. 26, 2003.
U.S. Appl. No. 10/301,552, filed, Nov. 21, 2002.
*The Dielectric People Portal II*, Spatial Guardian Inc., www.spatialguardian.com/products/people_portal/index.shtml.
Park, Sung Cheol, Park, Min Kyu and Kang, Moon Gi, *Super-Resolution Image Reconstruction: A Technical Overview*, IEEE Signal Processing Magazine, vol. 20, No. 3, pp. 21-36, May 2003.
Segall, C. Andrew, Molina, Rafael and Katsaggelos, Aggelos K, *High-Resolution Images From Low Resolution Compressed Video*, IEEE Signal Processing Magazine, vol. 20, No. 3, pp. 37-48, May 2003.
Rajan, Deepu, Chaudhuri, Subhasis and Joshi, Manjunath V., *Multi-Objective Super Resolution: Concepts and Examples*, IEEE Signal Processing Magazine, vol. 20, No. 3, pp. 49-61, May 2003.
Ng, Michael K. and Bose Nirmal K., *Mathematical Analysis of Super-Resolution Methodology*, IEEE Signal Processing Magazine, vol. 20, No. 3, pp. 62-74, May 2003.
Capel, David and Zisserman, Andrew, *Computer Vision Applied to Super Resolution*, IEEE Signal Processing Magazine, vol. 20, No. 3, pp. 75-102, May 2003.
*Transportation Security What Works*, Spatial Guardian Inc., www.spatialguardian.com/news_transec_1102.shtml, Nov. 2002.
Vollmerhausen, Richard H. and Driggers, Ronald G., *Dynamic Sampling, Resolution Enhancement, and Super Resolution*, Analysis of Sampled Imaging Systems, Chapter 6, pp. 125-138, 2000.
Laws, Kenneth I., *Goal-Directed Texture-Image Segmentation*, SPIE, vol. 548 Applications of Artificial Intelligence II, pp. 19-26, 1985.
Laws, Kenneth I., *Rapid Texture Identification*, SPIE, vol. 238 Image Processing for Missile Guidance, pp. 376-381, 1980.

\* cited by examiner

ENHANCED SURVEILLED SUBJECT IMAGING

BACKGROUND

Millimeter wave signals are used for radar and telecommunications. They are also capable of being used to produce an image of a subject by directing millimeter-wave signals at the subject and detecting the reflected signal. Examples of such imaging systems have been described in U.S. Pat. Nos. 5,455,590; 5,557,283; 5,859,609; and 6,507,309; and U.S. patent application Ser. No. 10/607,552 filed Jun. 26, 2003; U.S. patent application Ser. No. 10/697,848 filed Oct. 30, 2003; U.S. patent application Ser. No. 10/301,522 filed Nov. 21, 2002; and U.S. patent application Ser. No. 10/697,965 filed Oct. 30, 2003 which patent references are incorporated herein by reference.

When imaging systems are used for surveillance of persons in a security system, the safety of the facilities and patrons of the facility for which the surveillance is being conducted may depend on the effectiveness of the system. The imaging of persons subjected to surveillance may be more willing to allow the surveillance if it is performed in a manner that protects the person's privacy. This is particularly true in situations where the surveillance delays the intended progress of the person or persons being surveilled, such as prior to boarding a public transportation vehicle, or prior to entering a public or protected facility.

BRIEF SUMMARY OF THE DISCLOSURE

An imaging system can include an antenna apparatus configured to transmit toward and receive from a subject in a subject position, millimeter-wave electromagnetic radiation. A subject may include a person and any object or objects carried by the person. Such a system can also include a controller configured to operate the antenna apparatus, and produce image data representative of an image of the subject from received radiation.

At least a first portion of an image signal representative of radiation received by an antenna apparatus may be used to produce first image data representative of a first image of at least a portion of the subject. At least a second portion of the image signal corresponding to a portion of the first portion of the image signal may be used to produce second image data representative of a second image corresponding to a portion of the first image. The second image may have resolution that is greater than or less than that of the first image. An image of less resolution may make the image more acceptable to a person being surveilled. An image of greater resolution may disclose more detail in the subject, allowing objects to be more easily identified. A portion of the first image data having characteristics corresponding to characteristics of an object carried by the person may be identified for use in alerting an operator to the corresponding portion of an image.

BRIEF DESCRIPTION OF THE SEVERAL FIGURES

DETAILED DESCRIPTION OF VARIOUS EMBODIMENTS

Imaging Systems

Figure 1:
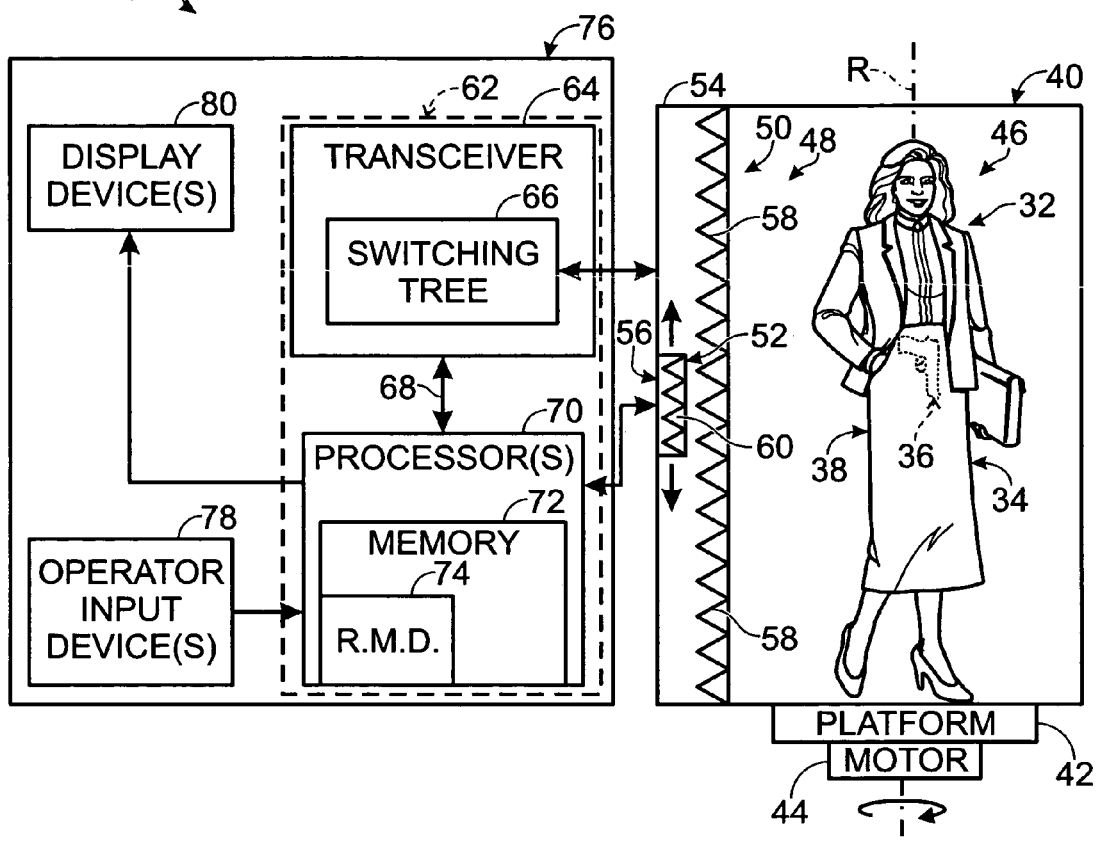
FIG. 1 is a general diagram showing an example of an imaging system.

FIG. 1 illustrates a security inspection system 30 that interrogates a subject 32. A subject 32 may include one or more animate objects, such as a person 34, and/or one or more inanimate objects, such as object 36. In operation, system 30 interrogates subject 32 by illuminating it with electromagnetic radiation in the 100 Megahertz (MHz) to 2 Terahertz (THz) frequency range and detecting the reflected radiation. Generally, the corresponding wavelengths range from several centimeters to a few micrometers. Such radiation may be either at a fixed frequency or over a range or set of frequencies using several modulation types, e.g. chirp, pseudorandom frequency hop, pulsed, frequency modulated continuous wave (FMCW), or continuous wave (CW).

Some embodiments of imaging systems may use a transmitting signal that incorporates frequencies in the range of 24 to 30 GHz, FMCW modulation, and having signal content that meets FCC unlicensed operation requirements and is outside of any restricted US Government frequency bands. Pulse lengths may range from 2–10 microseconds. Antennae beam widths may range from 20–120 degrees for broad beam implementation, or from 1 to 30 degrees for narrow beam width applications, depending on the image formation signal processor requirements. Various system polarizations may be used. Examples include same polarization, cross polarization, elliptical polarization, right circular polarization, and/or left circular polarization.

Certain natural and synthetic fibers may be transparent or semi-transparent to radiation of such frequencies and wavelengths, permitting the detection and/or imaging of surfaces positioned beneath such materials. When the subject of interrogation is a clothed individual, image information about portions of a person's body covered by clothing can be obtained with system 30, as well as those portions that are not covered by clothing. Further, image information relative to objects carried or supported by, or otherwise with a person beneath clothing can be provided with system 30 for metal and non-metal object compositions, such as those used for weapons and contraband.

As illustrated in FIG. 1, subject 32 includes a person 34 presented for interrogation by system 20. Person 34 is shown wearing clothing 38, which conceals object 36, shown in the form of a weapon. A subject includes all that is presented in an interrogation station of an imaging system for imaging, whether human, animal, or inanimate object. For example, if a person is in an interrogation station for imaging, the subject includes the person as well as any objects supported on the person, such as watches, keys, jewelry, pocket or other knives, coins, clothing accessories, guns, or any other objects that can be imaged. A subject may include one or more persons, animals, objects, or combination of these. Subject 32 is positioned in an interrogation station or portal 40 of system 30. Portal 40 may be configured for placement at a security checkpoint where it is desired to detect objects, such as weapons or contraband, on the person. Portal 40 may include a platform 42 connected to a motor 44. Platform 32 may be arranged to support subject 32. Motor 44 may be arranged to selectively rotate about rotational axis R while subject 32 is positioned thereon. For the configuration shown, axis R may be vertical, and subject 32 may be in a generally central subject position 46 relative to axis R and platform 42.

Portal 40 further may include an antenna apparatus 48 including a primary multiple-element sensing array 50 and a secondary multiple-element sensing array 52. Apparatus 48 may include a frame 54 on which arrays 50 and 52 are supported. Array 50 may extend the full height of frame 54. Array 52 may be mounted by a prime mover 56, for vertical movement along frame 54. Motor 44 causes platform 42, and subject 32 about axis R. As a result, arrays 50 and 52 circumscribe a generally circular pathway about axis R. The antenna arrays may be about 0.5 to about 2 meters from radius R.

Antenna array 50 may include a number of linearly arranged elements 58 only a few of which are schematically illustrated. Similarly, array 52 has linearly arranged elements 60. Each element 58 and 60 may be dedicated to transmission or reception of radiation, and the elements may be arranged in two generally vertical columns, with one column dedicated to transmission, and the other to reception. The number and spacing of the elements corresponds to the wavelengths used and the resolution desired. A range of 200 to about 600 elements can span a vertical length of about two or two and one-half meters.

Various other configurations for portal 40 and antenna apparatus may be used. For example, and as will become apparent, depending on operation of the antenna apparatus and controlled rotation of platform 42, a single array could be used to provide dual scanning of a subject. Further, plural arrays could be used in place of each array, the arrays can have the same or different array densities, and two-dimensional transmit and receive arrays may be used, as well as arrays that move around a subject position in a portal having a fixed platform.

Many variations of an antenna apparatus are possible. The antenna apparatus may include one or more antenna units, and each antenna unit may include one or more transmitting antennae and one or more receiving antennae. An antenna unit may include a plurality of antennae that may receive radiation in response to transmission by a single antenna. The antennae may be any appropriate type configured to transmit or receive electromagnetic radiation, such as a slot line, patch, endfire, waveguide, dipole, semiconductor, or laser. Antennae may both transmit and receive. The antennae units may have one or more individual antennae that transmit or receive like polarization or unlike polarized waveforms such as plane, elliptical, or circular polarization, and may have narrow or broad angular radiation beam patterns, depending on the application. Beam width may be relatively broad, i.e. 30–120 degrees for imaging applications that use holographic techniques, while narrow beam widths in the range of 0 to –30 degrees may be used for applications having a narrow field of view requirement.

Further, a single antenna may scan a subject by mechanically moving about the subject in a one- or two-dimensional path. A one- or two-dimensional array of antenna units may electronically and mechanically scan a subject. An imaging system may include one or a plurality of antenna apparatus, such as a second antenna apparatus 22'. The antennae apparatus may be protected from the environment by suitable radome material, which may be part of the apparatus, or separate, depending on the mechanical motion that is required of the antennae apparatus or array. Examples of other array configurations are illustrated in copending U.S. patent application Ser. No. 10/728,456 filed Dec. 5, 2003, incorporated herein by reference.

Antenna apparatus 48 may be configured to transmit and receive electromagnetic radiation selected from the range of about 1 Gigahertz (GHz) to about 2 THz, or from the range of about 100 MHz to about 15 GHz, depending on the impulse duration. A range of about 1 GHz to about 300 GHz may also be used, with a range of about 5 GHZ to about 110 GHz particularly useful for imaging. A range of 24 GHz to 30 GHz is used in some antenna apparatus. The antenna apparatus produces an image signal 68 representative of the received radiation.

A controller 62 may control operation of antenna apparatus 48. Controller 62 may include a transceiver 64 including a switching tree 66 configured to irradiate subject 32 with only one transmitting element 58 or 60 at a time, and simultaneously receive with one or more elements 58 or 60. Transceiver 64 may include logic to direct successive activation of each combination of transmit and receive antenna elements to provide a scan of a portion of a subject 32 along a vertical direction as platform 42 and the subject rotate.

An image signal 67 received from antenna apparatus 48 may be downshifted in frequency and converted into an appropriate format for processing. In one form, transceiver 42 may be of a bi-static heterodyne Frequency Modulated Continuous Wave (FM/CW) type like that described in U.S. Pat. No. 5,859,609. Other examples are described in U.S. Pat. Nos. 5,557,283 and 5,455,590. In other embodiments, a mixture of different transceiver and sensing element configurations with overlapping or nonoverlapping frequency ranges may be utilized, and may include one or more of the impulse type, monostable homodyne type, bi-static heterodyne type, and/or other appropriate type.

Transceiver 64 may provide image data 68 corresponding to the image signals to one or more processors 70. Processor 70 can include any suitable component for processing the image data, such as digital circuitry, analog circuitry, or both. Processor 70 may be programmable, such as a computer or microprocessor, a dedicated hardwired state machine, or a combination of these. For a multiple processor form, distributed, pipelined, and/or parallel processing can be utilized as appropriate.

Processor 70 may include a memory 72. Memory 72 can be solid state, electromagnetic, optical, or a combination of these, and it can be volatile and/or nonvolatile. Further, it may be dedicated, such as a resident hard drive, or random access memory (RAM), or removable, such as a Removable Memory Device (R.M.D.) 74, such as a floppy disc, tape cartridge, optical disc (CD-ROM or DVD), or other appropriate type.

Controller 62 may be coupled to motor 44, prime mover 56, or other drive element used, to selectively control the rotation of platform 42 or movement of an antenna array. Controller 62 may be housed in a monitor and control station 76 that also includes one or more operator input devices 78 and one or more display or other type of output devices 80. The input devices may include a keyboard, mouse or other cursor-control device, a voice recognition input system, or other appropriate device or system. Output devices may be visual or audio alarms, printers, communications links, or displays, such as cathode ray tube (CRT), Liquid Crystal Display (LCD), plasma, organic light emitting diode (OLED), or other appropriate display type. Appropriate communication links may include local area networks (LANs), municipal area networks (MANs), or Wide Area Networks (WANs), whether private or public.

Figure 2:
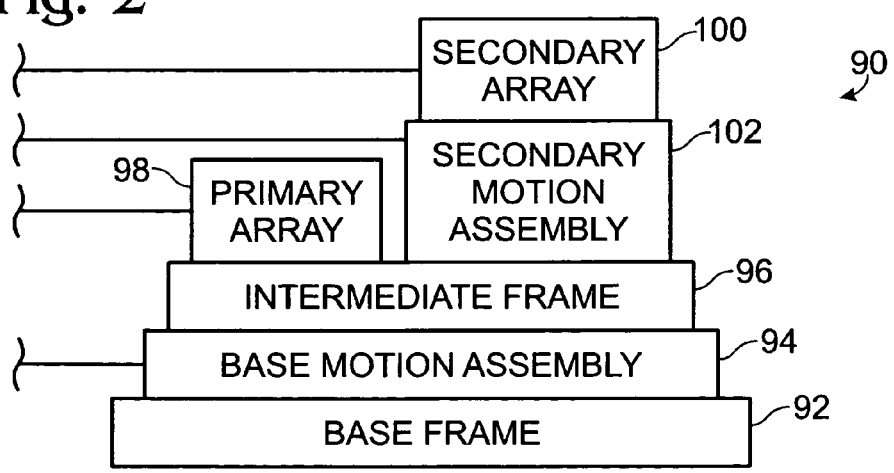
FIG. 2 is a block diagram illustrating an example of an antenna apparatus having a primary antenna array and a secondary antenna array.

FIG. 2 illustrates an optional configuration in block diagram form of an antenna apparatus 90 that may be used in an imaging system, such as system 30 having a rotating platform, or a system having a fixed platform. Antenna apparatus 90 may include a base frame 92 on which a base motor or other motion assembly 94 is mounted for providing relative motion between the base frame and an intermediate frame 96. Frame 96 may then support a primary antenna array 98 that moves relative to a subject with the intermediate frame. In some examples, a secondary array 100 may be included, as described for antenna apparatus 48. The secondary array may be mounted to a secondary motion assembly 102 attached to intermediate frame 96. This provides for movement of the secondary array relative to the primary array as well as relative to the base frame and subject. Other configurations may also be provided. For example, the primary and secondary arrays may both be fixedly attached to the intermediate frame, or the primary array may perform the functions of both arrays. Further, the primary and secondary arrays may be independently movable relative to the base frame. Additional primary, secondary, or other arrays may be used.

Figure 3:
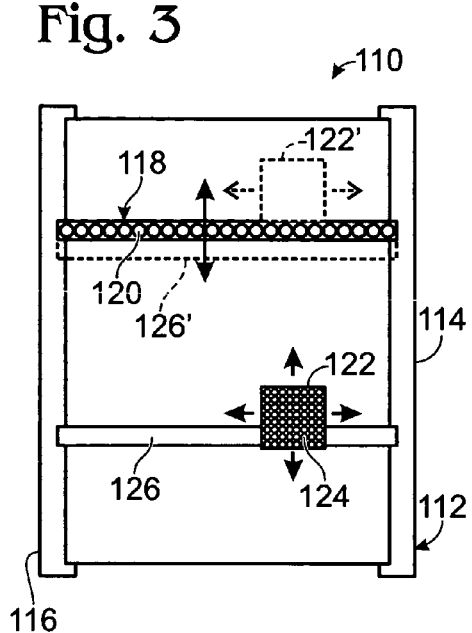
FIG. 3 is a side view of an example of the antenna apparatus of FIG. 2.

FIG. 3 illustrates a side view of an antenna apparatus 110, usable in an imaging system as has been described, and having a base frame 112 including left upright 114 and right upright 116. A primary antenna array 118, having antenna elements 120, may be mounted by a primary motion assembly, not shown, to frame 112 for moving vertically. A secondary antenna array 122, having a two-dimensional array of antenna elements 124, may be mounted relative to an intermediate frame 126 by a secondary motion assembly, not shown. In turn, intermediate frame 126 may be mounted relative to base frame 112 by a further motion assembly, also not shown. The antenna apparatus shown in FIG. 3 thus may provide for independent movement of the primary and secondary arrays. Optionally, a secondary array 122' may be mounted on an intermediate frame 126' for movement with primary array 118 and relative to (along) the primary array. Apparatus 110 accordingly may be used in an imaging system in which the subject is rotated, as is shown in system 30; in a system in which an image from a single side is produced; or in a system in which the antenna apparatus moves around a fixed subject platform.

The description that follows is presented largely in terms of display images, algorithms, and symbolic representations of operation of data bits within a computer memory. It may be preferred to implement a program or algorithm as various interconnected distinct software modules or features. This is not necessary, as software, firmware, and hardware may be configured many different ways, and may be aggregated into a single processor and program with unclear boundaries.

An algorithm is generally considered to be a self-consistent sequence of steps leading to a desired result. These steps require manipulations of physical quantities. Usually, though not necessarily, these quantities take the form of electrical or magnetic signals capable of being stored, transferred, combined, compared, and otherwise manipulated. When stored, they may be stored in any computer-readable medium. As a convention, these signals may be referred to as bits, values, elements, symbols, characters, images, terms, numbers, or the like. These and similar terms may be associated with appropriate physical quantities and are convenient labels applied to these quantities.

The present disclosure also relates to apparatus for performing these operations, such as has been described. This apparatus may be specially constructed for the required purposes or it may comprise a general-purpose computer selectively activated or reconfigured by a computer program stored in the computer or other apparatus. In particular, various general-purpose machines may be used with programs in accordance with the teachings herein, or it may prove more convenient to construct more specialized apparatus to perform the required method steps. The required structure for a variety of these machines will appear from the description given below. Useful machines for performing the disclosed operations include general purpose digital computers, microprocessors, or other similar devices, as has been described.

It should be clear to a person skilled in the art that the programs described need not reside in a single memory, or even a single machine. Various portions, modules or features of it can reside in separate memories, or even separate machines. The separate machines may be connected directly, or through a network, such as a local access network (LAN), or a global or wide area network, such as what is presently known as the Internet. Similarly, the users need not be collocated with each other, but each only with a machine that houses a portion of the program.

Object Detection

Figure 4:
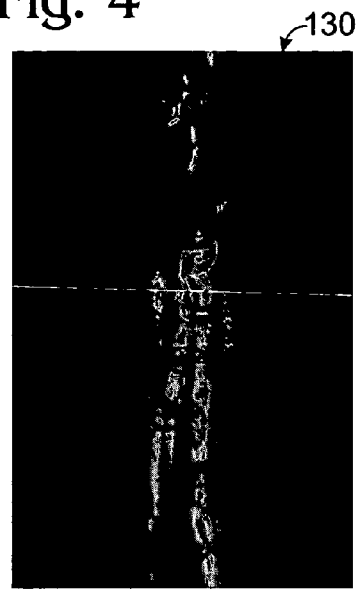
FIG. 4 is an image generated by a millimeter-wave imaging system of a mannequin having objects hidden by the clothes on the mannequin.
Figure 5:
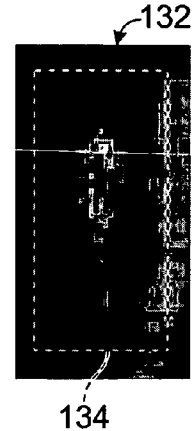
FIG. 5 is an enlarged view of a portion of the image of FIG. 4 showing an object.

Various techniques may be used for identifying objects that may be associated with a person being imaged. For example, once a first image of a subject has been obtained, such as with a primary antenna array, objects are detected manually by an operator of the system or automatically. When manual detection is used, a primary or first image 130, such as the image of FIG. 4, may be displayed on a system monitor. An operator may then identify positions or areas of the image that are suspected of being objects. For example, FIG. 5 illustrates an enlarged second image 132 of a portion of the image of FIG. 4 as defined by an outline 134 around the suspect area. Such an area may be defined and the enlarged image produced using image-enhancing algorithms. Such a program may also provide for image enhancement and increased resolution, in order to produce a clearer image of the region in a selected suspect area. For instance, the program may increase the number of picture elements or pixels used to image the suspect area. Image enhancement tools, such as interpolation techniques, may be used to make the image sharper.

Once a suspect area containing a possible object other than the person, is identified, the antenna apparatus may be used to provide a more detailed image of the suspect area. For instance, a secondary antenna array, such as array 52 shown in FIG. 1, array 100 in FIG. 2, or array 122 in FIG. 3, may be used to re-image the suspect area in greater detail than was originally provided.

Optionally, primary arrays may be re-used to re-image the suspect area. Increased resolution may be possible by increasing the firings per surface area of the subject, such as by reducing the rate of movement of the subject relative to the antenna array, or increasing the scanning rate for the antenna array. It may also be possible to produce the first, low-resolution image using a portion of antenna elements in the array, and to produce a second, higher-resolution image using all of the antenna elements corresponding to the selected region of the subject.

Accordingly, the image signal, whether it be a reworking of the portion of the image signal corresponding to the first image or a portion of the image signal corresponding to a rescan of the selected subject area, a secondary image may be produced that has a higher resolution than the primary image. This image may then be displayed for observation by an operator, to better determine whether an object is present, and if so, the nature of the object.

Characteristics of image data may also be automatically analyzed to determine whether there may be areas of an image that may include an object. Regions of a subject image that have characteristics that correspond to characteristics of images of known objects may be identified. Such an identification may be used to direct a system operator's attention to such areas, may be used to activate alarms, and may be used to initiate a rescanning of the suspect areas or to otherwise increase the resolution of the image.

It has been found that objects carried by a person may have the appearance of a "wavy texture" in the vicinity of objects hidden on a person. FIG. 4 shows an example of an image 130 of a mannequin with man-made objects placed on its body. This image is comparable to an image of a person. In the figure, the image of a knife appears on the abdomen, and an image of a gun appears on the back. Second image 132 shown in FIG. 5 is an enlargement of the image of the knife shown in FIG. 4. An image characterized as having picture elements with alternating high and low intensity levels, appearing as light and dark regions, may be suspected of being an object. This varying intensity level pattern or wavy texture pattern is visible in the image on and/or around the object.

The waviness may be detected by convolving the image with a waviness detection kernel. An exemplary kernel is given by the following five-by-five matrix of values:

| | | | | |
|---|---|---|---|---|
| 0.0278 | −0.1111 | 0.1667 | −0.1111 | 0.0278 |
| −0.1111 | 0.4444 | −0.6667 | 0.4444 | −0.1111 |
| 0.1667 | −0.6667 | 1.0000 | −0.6667 | 0.1667 |
| −0.1111 | 0.4444 | −0.6667 | 0.4444 | −0.1111 |
| 0.0278 | −0.1111 | 0.1667 | −0.1111 | 0.0278 |

Figure 6:
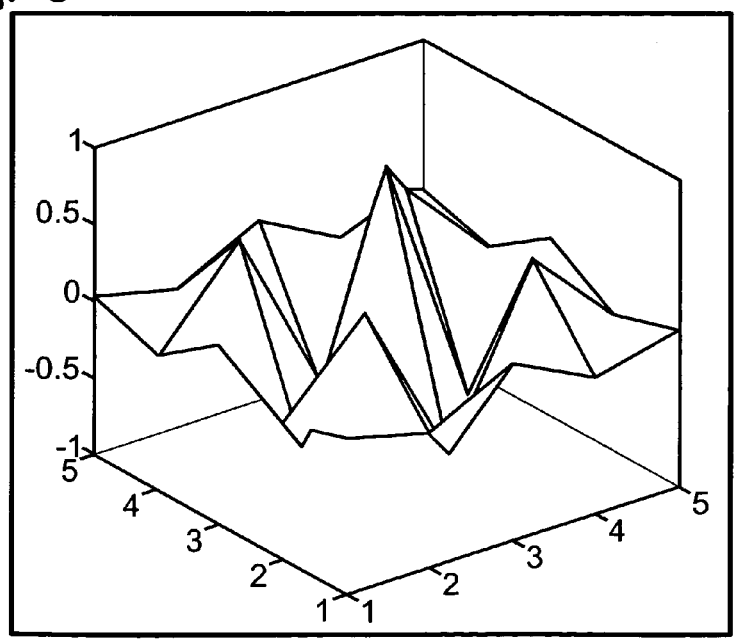
FIG. 6 is a graphic illustration of the values of a kernel used for object detection.

The "wavy" nature of the above set of numbers is illustrated in FIG. 6, which illustrates the relative magnitudes of a five-row-by-five-column grid corresponding to pixel positions. The values in the rows and columns of the kernel shift between negative and positive values, hence the term "wavy". Also, the values of these factors in this particular example have a maximum absolute value in or near the center, and a minimum absolute value around the periphery. This kernel thus gives the center the greatest weight or proportion in determining the new pixel intensity level. Additionally, the sum of the values of the factors is zero, so that no intensity level correction is needed as a result of the image transformation.

The kernel numbers above can be thought of as a small image window covering a corresponding five-by-five square of picture elements. This window is moved along the image. For each position of this window on the image, each value in the kernel is multiplied by the corresponding image intensity value (right below it) and the final result of the operation is the sum of the results of the 25 multiplications. Generally, the closer the relative values of the intensities of the pixels overlaid by the window are to the relative values in the kernel, the higher the magnitude or absolute value of the resulting sum.

Figure 7A:
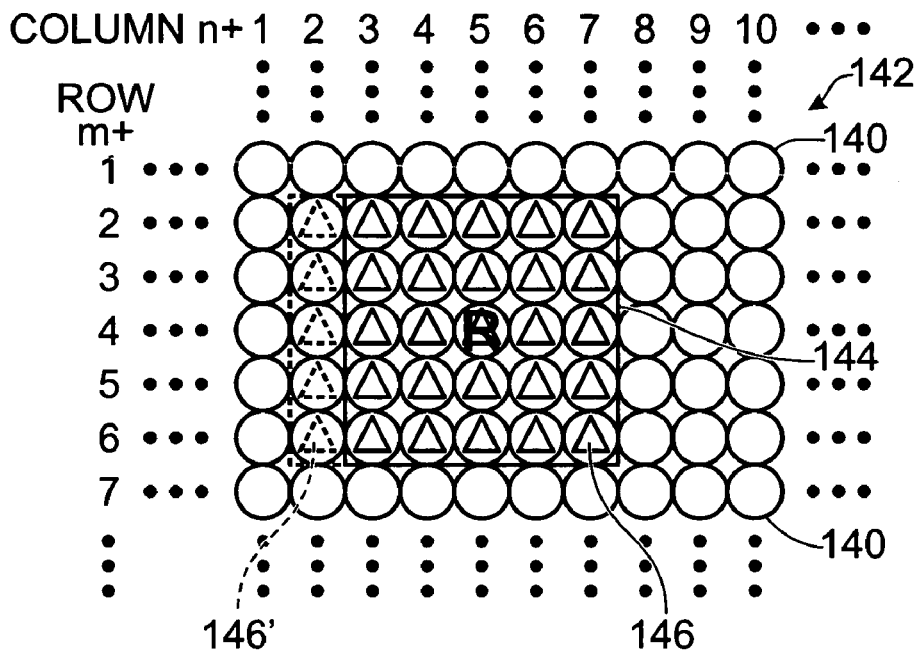
FIGS. 7A and 7B illustrate a sequence of steps illustrating application of a kernel to an image.
Figure 7B:
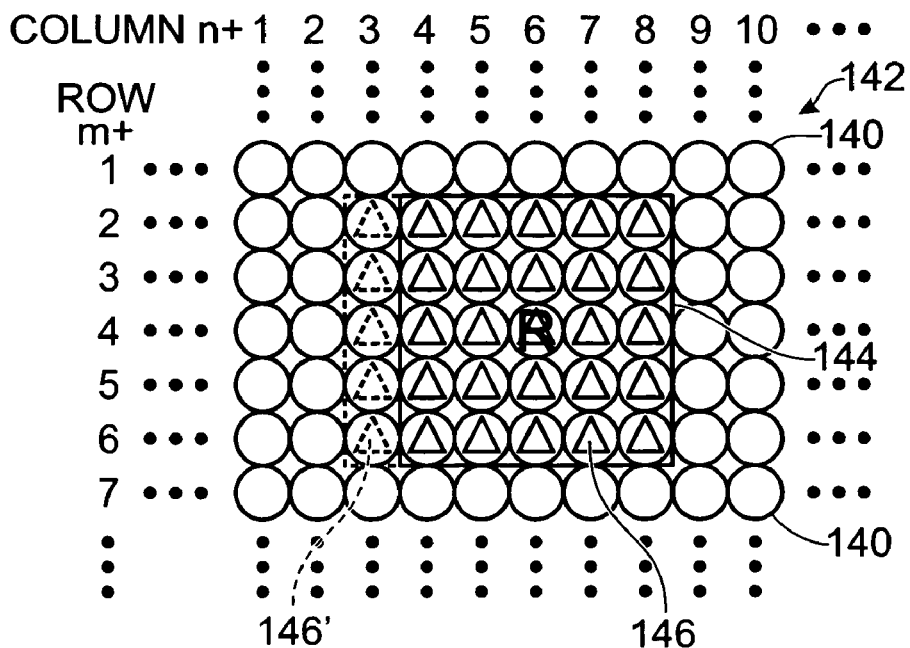

An example of this operation is illustrated in FIGS. 7A and 7B, which show two consecutive positions of the window. In these figures, the circles 140 represent the intensity levels of pixels making up a subject image 142. The square 144 represents the "window" of the kernel, with the kernel values represented by the triangles 146. The triangles 146' shown to the left of square 144 simply represent a row of pixels that were included in window 144 during the previous computation. As mentioned, each kernel value is multiplied by the intensity level of the pixel it is associated with in a given position of the window. The resulting 25 products are summed. The sum magnitude is assigned to a reference pixel R, which may be any pixel position considered appropriate.

The new values of the pixels in the image thereby have reduced resolution relative to the original image, as a result of replacing the original pixel value with a value based on or derived from a plurality of picture elements. This reduced resolution may be due to a blurring of the original image, or transforming the original image into a new image different than the original image. In this case, the new intensity level of each pixel is a function of the intensity level of one or more other picture elements. In particular, the new intensity level is related to the position of the reference pixel relative to the other pixels used to determine the new value of the reference pixel.

This sum provides an indication of the correlation of the 25 pixels associated with the reference pixel to the relative variations or texture represented by the kernel. The higher the magnitude of the sum, the higher the correlation. In this example, the pixel in the center of the window is considered the reference pixel.

Figure 8:
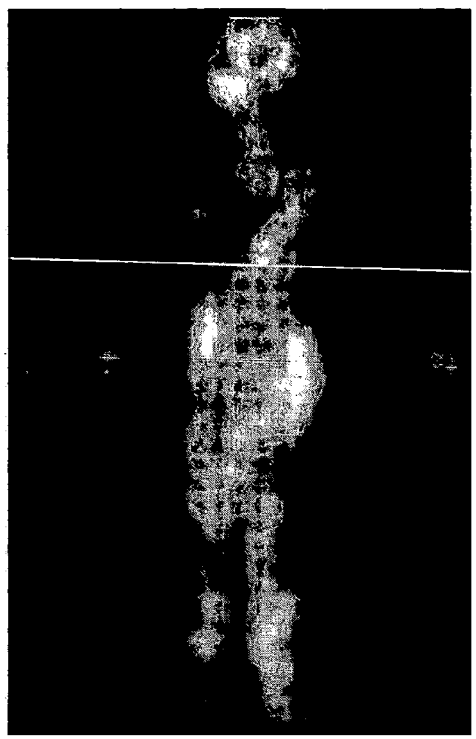
FIG. 8 is an image primarily resulting from applying the kernel of FIG. 6 to the image of FIG. 4 to identify suspect areas of the image.

FIG. 7B shows the position of window 144 during the next step in which the window is shifted one pixel row to the right. This process continues until the subject image 142 is convolved into a new "image" with its values containing the results of the above operation for each pixel or selected pixels of the image. After smoothing and stretching to occupy a fixed dynamic range, the new image is a "waviness image" 150 shown in FIG. 8, in which the lighter areas indicate the local presence of the waviness texture. In other words, the image of FIG. 8 is a mapping of the extent the selected subject-image characteristic is present. It is seen in the waviness image that the biggest and brightest regions of waviness appear where the knife and gun are in the original subject image.

Figure 9:
FIG. 9 is an image resulting from applying a threshold to the image of FIG. 8.

Once the waviness image is produced from the original subject image, the brightest regions of the waviness image may be identified by running a threshold analysis on the image. Small contrasting regions or holes may also be eliminated in order to make the resulting image more uniform. In this analysis, a new image as shown in FIG. 9 is produced by assigning a distinct intensity level, such as that corresponding to white, to those regions of the waviness image having at least a selected intensity or waviness value, such as 80 per cent of maximum. The other regions are assigned a distinguishable value, such as zero or black level intensity. This image then shows those regions in which strong correlation exists for the selected image characteristic.

Figure 10:
FIG. 10 is an image resulting from dilating the highlighted areas of the image of FIG. 9 and removing small regions.

The intent is to identify graphically those regions of the subject image where there are suspected objects. These regions can then be displayed or otherwise identified to a system operator, so that they can evaluate the images or the subject further. The above process may result in minor regions being identified for which it is unlikely that they correspond with an object on the person. The image may accordingly be cleaned up by dilating the highlighted spots and then deleting smaller regions not expected to be significant. Dilating is a process of expanding highlighted regions. One way of doing this is by passing another "window" of analysis over the image, and for a given reference pixel, if there are more white pixels than a preset threshold, then the pixels in the entire window are made white. An exemplary result is shown in FIG. 10.

Figure 11:
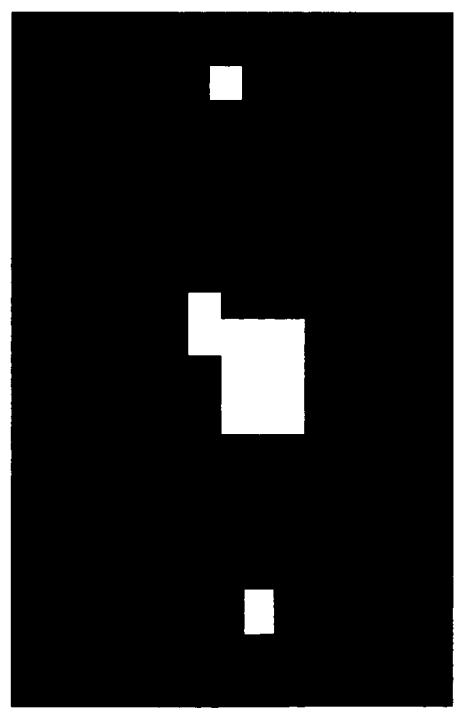
FIG. 11 is an image marking all pixels that belong to one or more bounding rectangles to the highlighted areas of the image of FIG. 10.
Figure 12:
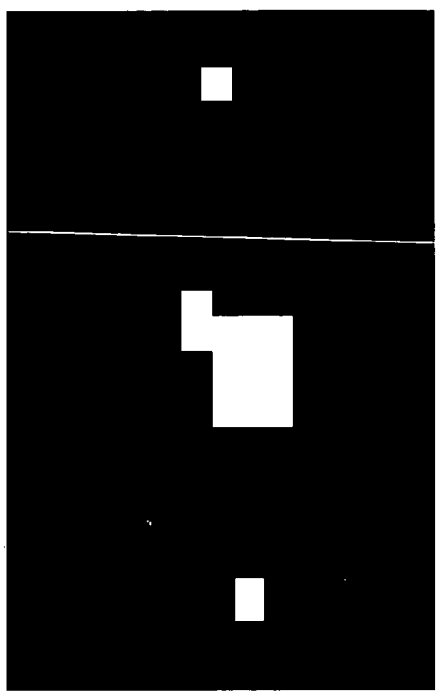
FIG. 12 is an image resulting from dilating the highlighted areas of the image of FIG. 11.

To simplify the imaging of the suspected object areas, rectangles that bound the highlighted regions may be identified. FIG. 11 illustrates an example of such a process. These regions are larger in size than the previously highlighted regions, and also include, in some cases, a single area that includes more than one suspected area. This image may again be dilated to further combine closely spaced areas. The image that results from one such process is shown in FIG. 12. It is seen that in this case, the image of FIG. 12 is nearly the same as the image of FIG. 11. Different criteria for dilating may produce different results. This image may then be used as a final mask of the suspect areas.

Figure 13:
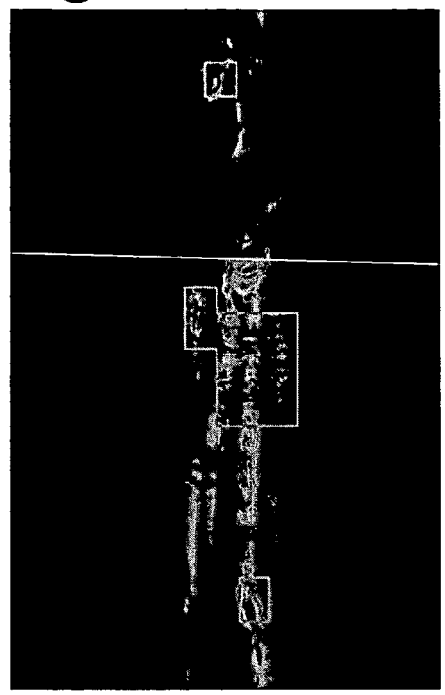
FIG. 13 is a copy of the original image of FIG. 4 superimposed with the outlines of the highlighted areas of FIG. 12, which correspond with suspect areas in the original image.

To facilitate the identification of objects on the subject image, the outlines of the suspect areas, derived from the image of FIG. 12, may be added to a display of the original image, as shown in FIG. 13. Optionally, as is discussed below, the portions of the original subject image within the suspect areas may be superimposed on a modified subject image to preserve privacy concerns of a subject person. Additionally, the technique described with reference to FIGS. 4–13 represents one type of technique for identifying objects and/or suspect areas of a subject. Other techniques can be used, and this technique can be used with other techniques to identify objects or suspect areas. For instance, a technique that detects other characteristics of an image, that may distinguish an image of an object from an image of a person's body, may be used in combination with this technique. Further, progressive processing of an image may lead to mote information about objects included in the image, such as processing that further modifies the image of FIG. 8. Such information may lead to classification of an object as a suspect object, or as a benign object, depending on the characteristics.

Preserving Privacy

As is apparent, the subject images generated by a millimeter-wave imaging system show the subject without its clothes. In some cases, for privacy reasons, it may be desirable to avoid displaying the generated image to a human operator. Knowledge of the location of the man-made objects as provided by the previously described process, make it possible to display only those portions of a subject image that are suspected of including objects. These suspected regions can thus be displayed without displaying the entire image of the subject.

It is desirable then, to facilitate the understanding of an observer of the image, as to the location of the suspected regions, by generating an image which, on one hand, hides the areas of the subject that are under clothes worn by the subject and, on the other hand, shows the "general impression" of the human subject's body and pose. For the purposes of this disclosure, such an image is referred to as a p-image, with "p" standing for "privacy". The p-image may be modified by replacing all the pixels in a suspect region with the original image values. In this way, privacy is compromised only in regions that were determined to be suspect.

One could consider that an image such as that shown in FIG. 8 resulting from convolving the subject image with a waviness kernel, could be used as a p-image, since it results in an image of reduced resolution. However, this image may not dependably produce an image that corresponds sufficiently with the form of a subject's body. Another approach is to use a different kernel. For example, a kernel having the following five-by-five grid of values may be used:

| 0.0625 | 0.1875 | 0.2500 | 0.1875 | 0.0625 |
| --- | --- | --- | --- | --- |
| 0.1875 | 0.5625 | 0.7500 | 0.5625 | 0.1875 |
| 0.2500 | 0.7500 | 1.0000 | 0.7500 | 0.2500 |
| 0.1875 | 0.5625 | 0.7500 | 0.5625 | 0.1875 |
| 0.0625 | 0.1875 | 0.2500 | 0.1875 | 0.0620. |

Figure 14:
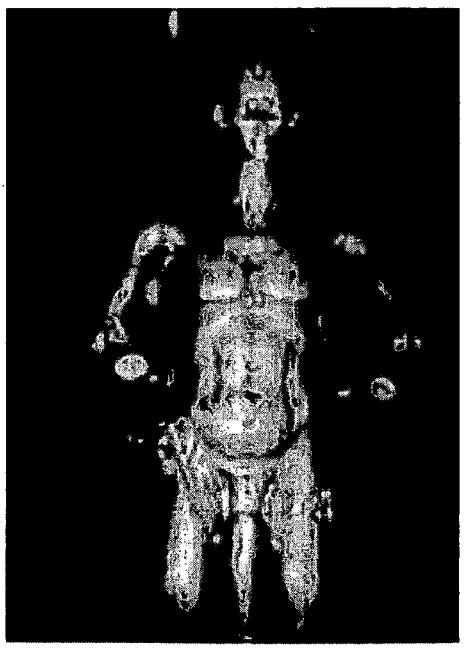
FIG. 14 is another image generated by a millimeter-wave imaging system of a mannequin having objects hidden by the person's clothes.
Figure 15:
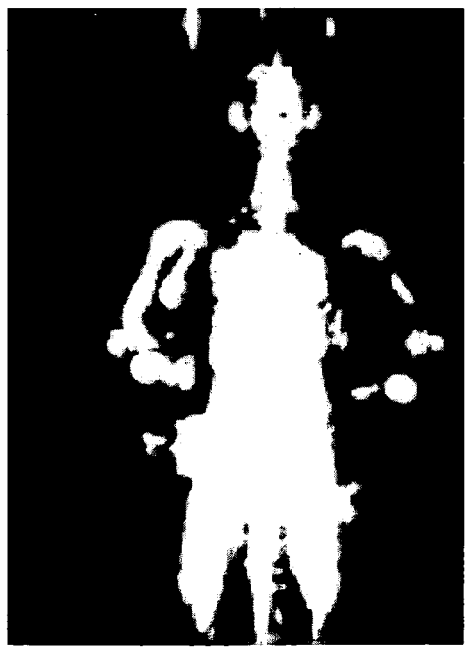
FIG. 15 is an image resulting from applying another kernel to the image of FIG. 14.
Figure 16:
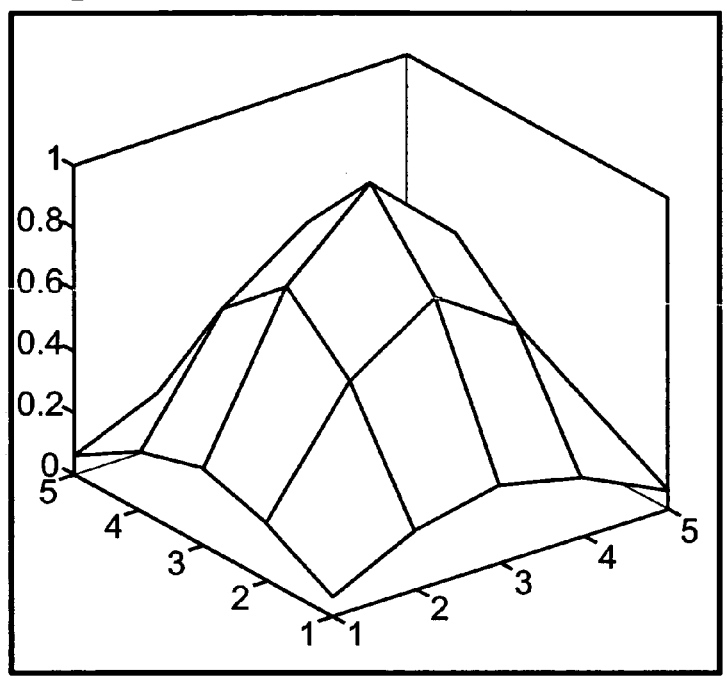
FIG. 16 is a graphic illustration of the values of the kernel applied to the image of FIG. 14 to produce the image of FIG. 15.

FIG. 14 illustrates a subject image made of a mannequin on which several objects are supported. The kernel is applied to the subject image using the same process as described previously. The result is the substantially modified p-image shown in FIG. 15. A graphic representation of the values of the kernel are shown in FIG. 16. It is seen that this kernel has all positive values with the values being a maximum at the center and lowest values along the outer edges. This kernel tends to produce a weighted average of the pixels in the region and produces values that tend to be either high or low. The high pixel values are displayed as white or light, and the low pixel values are displayed as black or dark. The p-image retains the general form of the original subject image without showing the details of the subject image.

Figure 17:
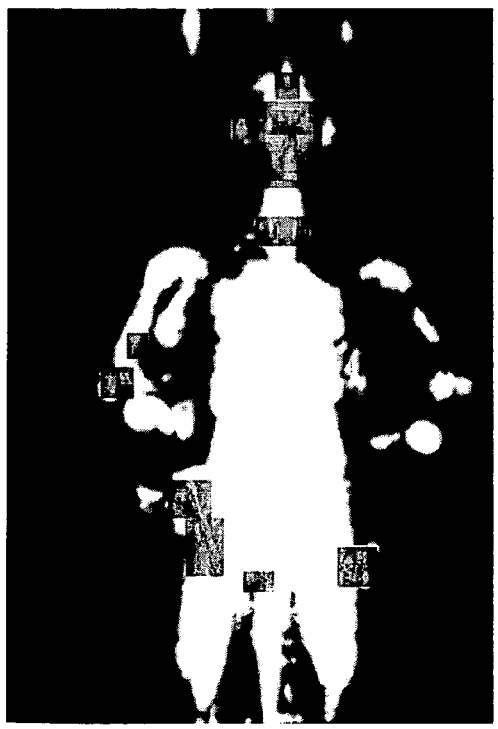
FIG. 17 shows the image of FIG. 15 superimposed with suspect portions of the original image of FIG. 14.

FIG. 17 shows a "final" image that may then be displayed to a system operator for evaluating whether the subject person has objects hidden under his or her clothing. The final image includes the p-image with suspect regions replaced with the corresponding portions of the original subject image. The suspect regions may be identified using the process described above.

Figure 18:
FIG. 18 is a modified image resulting from applying a threshold to the image of FIG. 14.

A p-image may also be produced in another way. In this example, the original subject image, such as the image shown in FIG. 14, may be used to generate a rough mask everywhere the body appears on the image. A threshold process is used to modify the subject image, producing an image with fewer levels of intensity, such as two levels of intensity, following a process as discussed above. When applied to the subject image of FIG. 14, an image as shown in FIG. 18 may be produced. This image may be used as a p-image, however a more general form of the image may be desired.

Further processing of the threshold image may be performed. For example, the image may be eroded to get rid of small regions. This may be like performing a process that is reverse to the process of dilating described above. Eroding the image, for instance, may include replacing a high pixel intensity value with a low pixel intensity value when a selected number of the surrounding pixels have a low intensity level. The pixels for which an evaluation is made may be selected by defining an association with a subject or reference pixel, such as by use of a pixel window, as discussed above.

Figure 19:
FIG. 19 is an image resulting from eroding the image of FIG. 18.

A result of such an erosion process is illustrated in FIG. 19. It is seen that the process used in this case changed the image very little. Other erosion techniques may be used to produce more noticeable changes. For instance, the intensity level of a high-intensity level reference pixel may be changed to a low level if only a small number of pixels in the window have a low intensity level.

Figure 21:
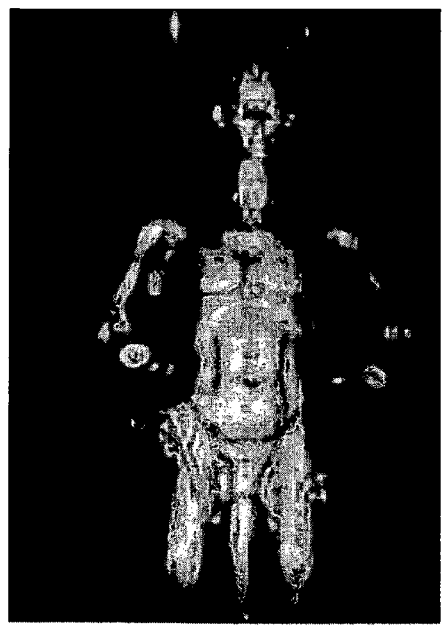
FIG. 21 is a copy of the image of FIG. 14.
Figure 22:
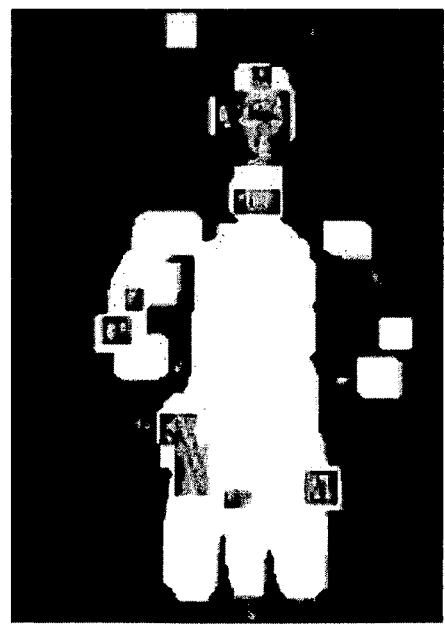
FIG. 22 is the image of FIG. 20 superimposed with suspect portions of the original image of FIG. 21.

The eroded image may be further generalized by dilating it, as discussed above. By using a large pixel window, and an aggressive conversion scheme, the eroded image of FIG. 19 may be converted into the dilated image of FIG. 20. Even this dilated image retains a recognizable general form corresponding to the original subject image. Using this dilated image as the p-image, it may then be enhanced by replacing suspect areas with corresponding portions of the original subject image, as has been described. FIG. 21 is a copy of the subject image of FIG. 14. FIG. 22 is the enhanced p-image having portions replaced with corresponding portions of the subject image. It is seen that details of the person's body are hidden from view, except for those portions associated with suspect areas. Further, the original images of the suspect areas are retained, so that an operator can obtain a clear image of any objects in the suspect areas.

Figure 23:
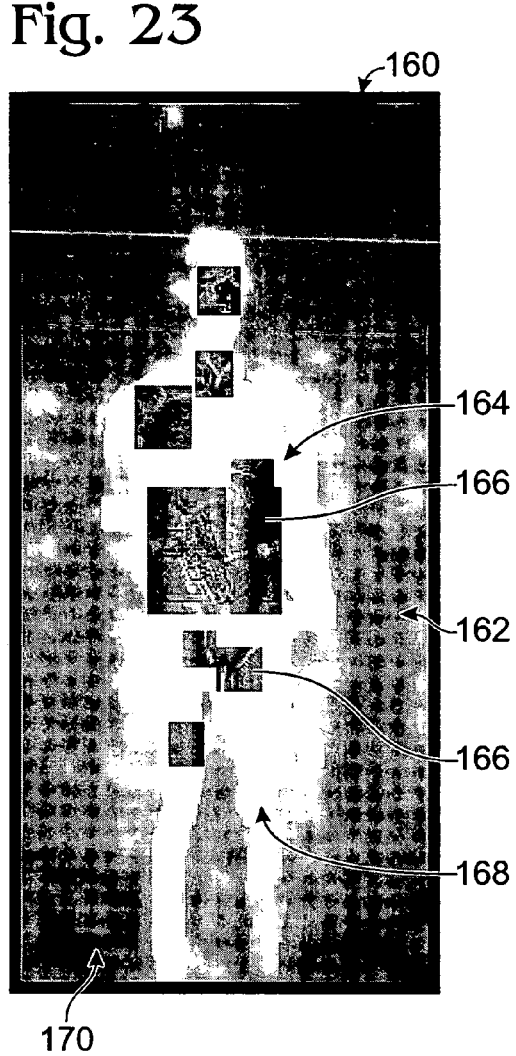
FIG. 23 is an image resulting from modifying an image similar to the image of FIG. 8 with a human form component made more visually distinct from the background.

As can be seen, privacy images may be formed in different ways. For instance, FIG. 23 illustrates a further display image 160 formed as a combination of images produced by the processes previously described. Display image 160 is composed of two basic components, a privacy image or p-image 162 and a group 164 of suspect regions 166. The determination of the suspect regions may be the same as that described previously and illustrated in FIGS. 4–13, or by use of other appropriate technique.

Figure 24:
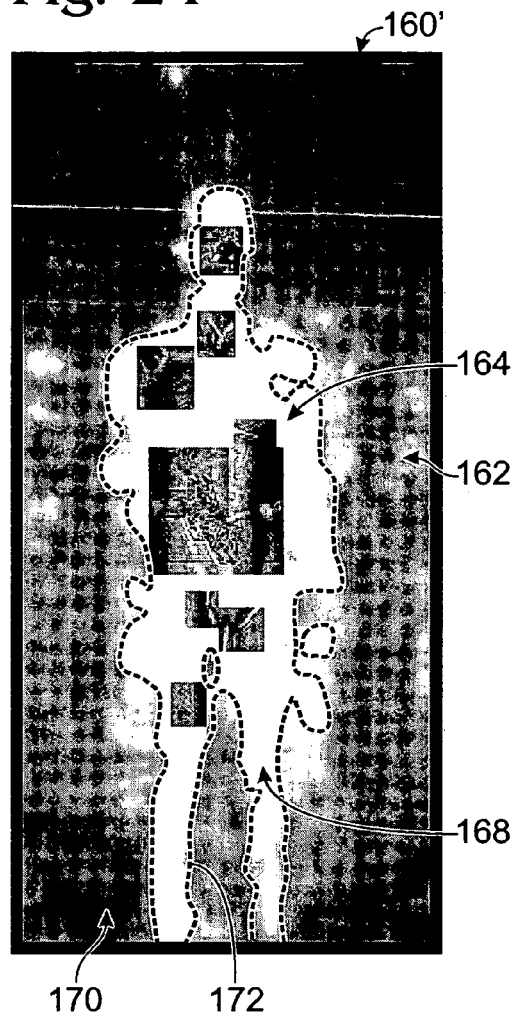
FIG. 24 is the image of FIG. 23 with the addition of a dashed line along the boundary separating the human form component from the background.

The privacy image shown is formed of two image components, a human-form component 168 and a background component 170. The image may be divided into more components, and the shapes of the components may vary. For instance, the background portion may only be a band or a portion of a band around the human-form component. The human form component may or may not conform generally to the shape of the person. In order to clarify the approximate location of the boundaries between the two components, display image 160 is repeated in FIG. 24 as image 160'. Image 160' is the same as image 160 except that the boundary between the two components is identified by a dashed line 172. In this example, both of these components may be derived from a preliminary p-image corresponding to image 150 shown in FIG. 8, which resulted from convolving a kernel with the original image, as has been described. Other forms of privacy images may be used. Image 150 makes the human form very distorted and/or blurry, and may also be referred to as a fuzzy image. A mask that corresponds with the general form of the person's body may then be used to further modify the privacy image. An example of such a mask is the privacy image shown in FIG. 20, which was developed from an original image corresponding to image 130 shown in FIG. 4, using a technique such as the one described with reference to FIGS. 14–20. Other forms of masks could also be used, such as a mask derived from a silhouette of the subject image in the original image.

Other techniques may be used to develop a human-form mask, including using a technique that begins with a fuzzy image or other image having an identifiable human form. In the techniques described previously, in which suspect areas are positioned on a privacy image in the same relative position as they existing in an original image, a human-form component that corresponds with the general proportions of the surveilled person's body may make it easier for an observer to locate the position of the suspect areas on the person.

Figure 20:
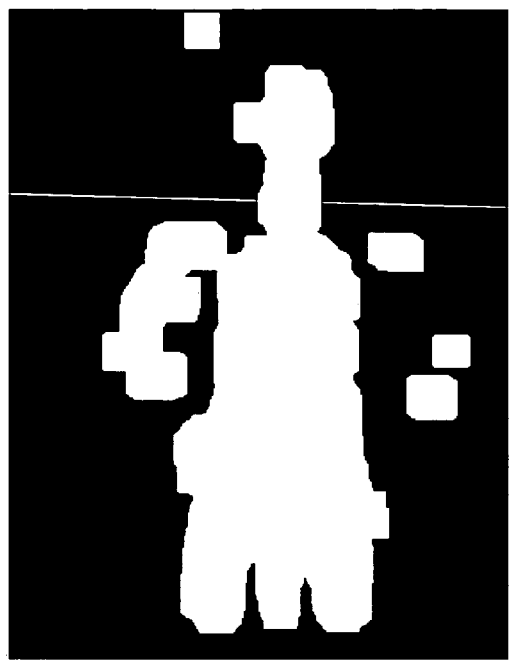
FIG. 20 is an image resulting from dilating the image of FIG. 19.

The portion of the fuzzy image of FIG. 20 that corresponds generally to the survelled person's body may be enhanced relative to the rest of the image. For example, the luminance of the pixels making up the human-form component 168 may be increased in white level compared to the luminance of the pixels making up the background component 170 of the image. This increased differentiation may be accomplished by giving the pixel luminance values of the human-form component a higher relative value than the pixel luminance values of the background component. The table below illustrates various ways this may be accomplished.

Relative Compartment Differentiation Schemes

| HUMAN FORM COMPONENT | BACKGROUND COMPONENT |
| --- | --- |
| INCREASE MORE | INCREASE LESS |
| INCREASE | NO CHANGE |
| INCREASE | DECREASE |
| NO CHANGE | DECREASE |
| DECREASE LESS | DECREASE MORE |

For example, the pixels of both components may be increased in value, with the human form component increased more than the background component. Similarly, the pixels of both components may be decreased in value, with the human form component decreased less than the background component. As an example, the human-form component may be increased by a factor of 1.2 and the background may be decreased by a factor of 0.8. In other words, the luminance of each pixel of the human-form component may be multiplied by 1.2 and the luminance of each pixel of the background component may be multiplied by 0.8. This results in the human-form pixels appearing significantly brighter than the background pixels, as is shown in FIG. 23. Accordingly, in this example, the human-form component pixels appear brighter than they appear in the original image, and the background component pixels appear darker.

It will be appreciated that the p-image resulting from a combination of image processes, produces an image in which the two image components are more visually distinct. Although the "waviness" image of has inherent human-form characteristics, these human-form characteristics are enhanced without including details of the original image (except for the images of the suspect regions, which are not part of the p-image). A similar result could be accomplished by reversing the relative changes listed in the table above, and make the human-form component darker than the background component. Additionally, the effect could be accomplished by changing the relative values of any visually perceived characteristic or adding a distinguishing characteristic or feature to one or both of the components. Distinguishing characteristics may also include resolution, image patterns (such as speckling or cross-hatching), or chrominance characteristics, such as color, hue, tint, tone, brightness, saturation, intensity or other visually perceived shift in color space. It is seen that numerous possible combinations and variations are possible.

The effect produced in these processes may be controlled by selection of the number of pixels included in the pixel window, the shape of the pixel window, and the decision criteria, such as threshold values, used to change the intensity levels of pixels in the image.

Figure 25:
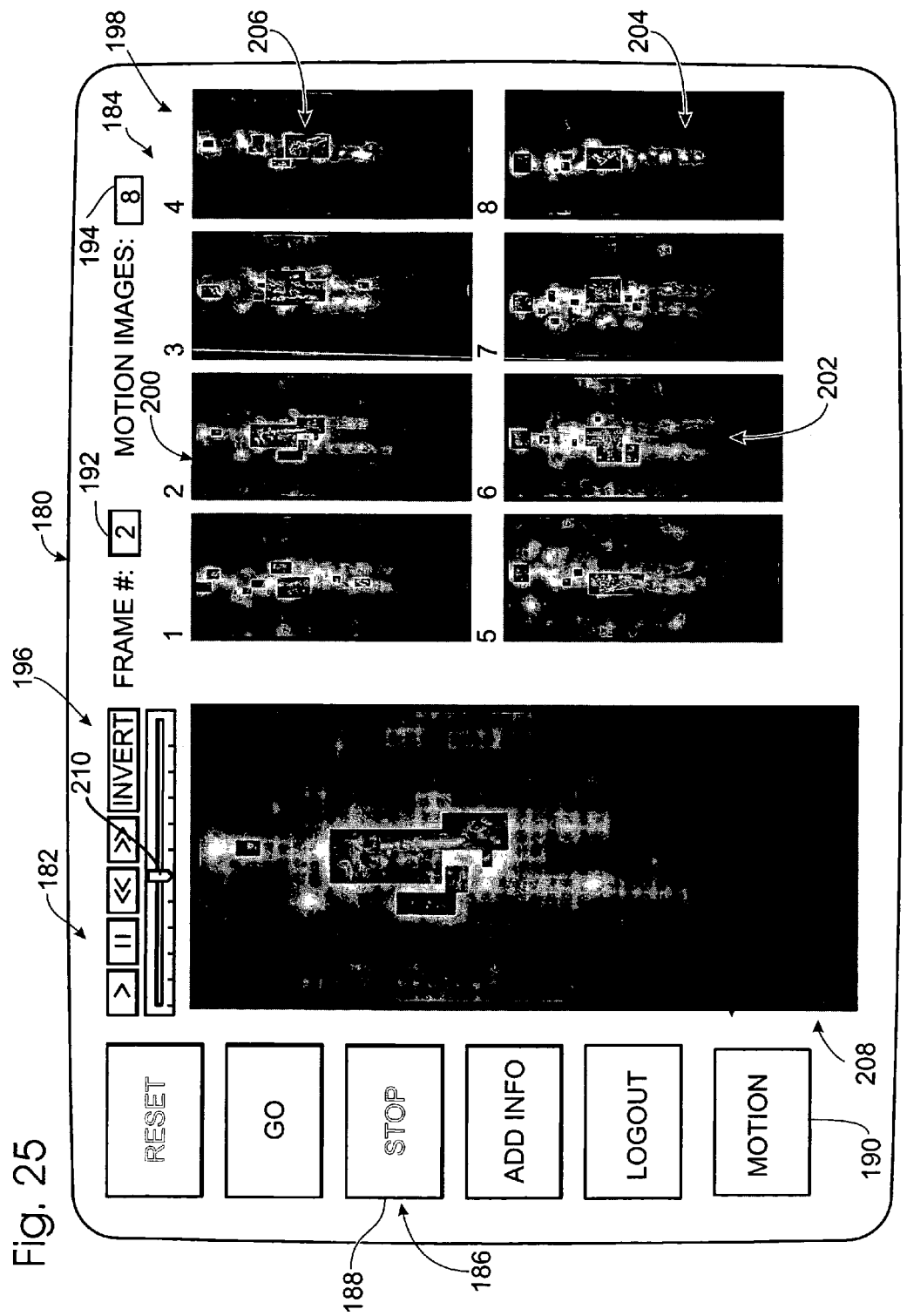
FIG. 25 is an exemplary display of a surveillance system having an imaging apparatus adapted to display privacy images and suspect regions.

FIG. 25 illustrates a display 180 of a display device 80 of a security inspection system 30. Display 180 may be a computer-generated display of a control panel 182 and displayed subject images 184. Control panel 182 may include a variety of display and system operation controls 186, such as control keys 188 and 190. The control panel also includes a frame selection field 192, a motion images field 194, and a motion display control panel 196.

Various configurations of a subject image or images 184 can be provided. In this example, eight frames 198 of images corresponding to views of the subject at 45-degree increments around the subject are shown. Other numbers of frames may also be shown. The frames are numbered sequentially, with a frame number 2 containing an image 200. Each frame includes a subject image 202, which in this instance is a privacy image 204 of the subject, such as provided by the processes described with reference to FIGS. 4–24. Suspect regions 206 of the detailed subject image, such as regions identified by an object-identification algorithm, as discussed above, are super-imposed on the privacy images.

A selected one of the frames is enlarged and displayed as a primary image 208. The enlarged frame includes enlargements of the suspect regions, making them easier to see by an operator. Further, the primary image may be used to display the appearance of rotational motion of the subject by showing sequentially frames 198. Successive views of suspect areas on a subject may provide easier identification of the shape and location of objects than is achieved with a still image. With 8 frames selected in field 194 for motion imaging, frames 1 through 8 are shown in succession to give the appearance of rotation of the subject. Motion may be controlled using motion display control panel 196.

Fewer or more than eight frames also may be used for displaying the appearance of motion. For example, 4, 16, 20, 32, 36, 72 or other number of frames may be used. Displaying frames having images displaced at regular angular intervals may give an appearance of rotation of the subject at a constant rate. Uneven time and/or angle intervals may also be used. The rate of display of the images may also be varied to vary the apparent rate of rotation of the subject. For example, a linear control element 210 may be used to control the rate of image viewing, to control the selection of an image in the sequence of images for still-image viewing, or to control other functions. Other controls may also be used, such as a digital fields 192 and 194. Further, the field of displayed frames, such as frames 1 through 8 shown in FIG. 25, may be varied, and the frames may represent only a portion of the frames in a sequence of frames. A display 180 may thus include more or fewer frames or images than those shown. For example, only a primary image 208 may be shown. Many display variations are possible.

Accordingly, while the inventions defined in the following claims have been particularly shown and described with reference to the foregoing preferred embodiments, those skilled in the art will understand that many variations may be made therein without departing from the spirit and scope of the inventions. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present disclosure. The foregoing embodiments are illustrative, and no single feature or element is essential to all possible combinations that may be claimed in this or later applications. Where the claims recite "a" or "a first" element or the equivalent thereof, such claims should be understood to include one or more such elements, neither requiring nor excluding two or more such elements. Further, cardinal indicators, such as first, second or third, are used to distinguish between the elements, and do not indicate a required or limited number of such elements, nor does it indicate a particular position or order of such elements unless otherwise specifically stated.

INDUSTRIAL APPLICABILITY

The methods and apparatus described in the present disclosure are applicable to security, monitoring and other industries in which surveillance and imaging systems are utilized.

What is claimed is:

1. An imaging system comprising:
an antenna assembly including at least a first antenna apparatus, each antenna apparatus configured to transmit toward and receive from a subject, including a person and any discernable objects with the person, in a subject position, electromagnetic radiation in a frequency range of about 100 MHz to about 2 THz, from positions spaced from the subject position, the antenna assembly producing an image signal representative of the received radiation; and
a controller adapted to produce from at least a first portion of the image signal first image data corresponding to a first image of at least a portion of the subject having a first resolution, and to produce from at least a second portion of the image signal second image data corresponding to a second image of at least a portion of the subject having a second resolution greater than the first resolution.

2. The system of claim 1, in which the antenna assembly is adapted to operate selectively in a first mode to produce the first portion of the image signal, and in a second mode to produce the second portion of the image signal, the controller being further adapted to operate the antenna assembly in the first mode, to determine whether the first image includes characteristics corresponding to an object on the person, and when the first image is determined to include characteristics of an object, to operate the antenna assembly in the second mode appropriate or the antenna assembly to produce the second portion of the image signal corresponding to the characteristics of an object.

3. The system of claim 2, in which the antenna assembly further includes a second antenna apparatus adapted to produce the second portion of the image signal, and the processor is further adapted to operate the first antenna apparatus during operation of the antenna assembly in the first mode, and to operate the second antenna apparatus during operation of the antenna assembly in the second mode.

4. The system of claim 3, in which the antenna assembly further includes a first moving mechanism adapted to move the first antenna apparatus relative to the subject position, and a second moving mechanism adapted to move the second antenna apparatus relative to the first moving mechanism.

5. The system of claim 4, in which the first moving mechanism also is adapted to move the second antenna apparatus relative to the subject position.

6. The system of claim 2, in which the first and second images include a common portion of the subject.

7. The system of claim 6, in which the first portion of the image signal includes at least part of the second portion of the image signal.

8. The system of claim 2, in which the processor is adapted to generate the first image data with picture elements having different levels of intensity, and to determine a correlation of the levels of intensity of at least one group of picture elements with the levels of intensity of a corresponding reference group of picture elements that are characteristic of an object.

9. The system of claim 8, in which the processor is further adapted to identify as the second portion of the image signal at least a portion of the first image data corresponding to which there is at least a threshold correlation of the levels of intensity of the at least one group of picture elements.

10. The system of claim 9, in which the processor is further adapted to determine the correlation of the levels of intensity of the at least one group of picture elements by determining a correlation value for a given picture element as a function of the intensity level of one or more other picture elements.

11. The system of claim 10, in which the processor is further adapted to determine the correlation value for a given picture element by determining a correlation value for the given picture element that is based on the intensity levels of a group of associated picture elements arranged relative to the given picture element.

12. The system of claim 11, in which the processor is further adapted to determine the correlation value for the given picture element by modifying the original intensity level of each picture element of the group of associated picture elements, by an amount related to the position of the picture element in the group relative to the given element, and combining the modified intensity levels.

13. The system of claim 12, in which the processor is adapted to modify the original intensity level by associating a factor with each picture-element in the group of picture-elements, with at least two of the factors being different, and multiplying the original intensity level of each picture element in the group by the factor associated with the picture element.

14. The system of claim 13, in which the group of adjacent picture-element positions includes a center picture-element position, with the factor associated with the center picture-element position having a value greater than the value of the other factors.

15. The system of claim 14, in which the group of adjacent picture-element positions form at least one row of picture-element positions, with the factors of the picture-element positions in the at least one row including at least one positive value and at least one negative value.

16. The system of claim 15, in which the group of adjacent picture-element positions form a grid of columns and rows of picture-element positions, with the factors of the picture-element positions in each row and column alternating between positive and negative values.

17. The system of claim 1, in which the second image includes at least a portion of the first image.

18. The system of claim 17, in which the first and second image data includes picture elements each having a level of intensity, and the second image data includes picture elements having levels of intensity based on levels of intensity of one or more corresponding picture elements in the first image data.

19. The system of claim 18, in which the second image data includes picture elements having levels of intensity determined by interpolating picture elements in the first image data.

20. The system of claim 17, in which the second image is enlarged compared to the first image.

21. An imaging system comprising:
an antenna assembly including at least a first antenna apparatus, each antenna apparatus configured to transmit toward and receive from a subject, including a person and any discernable objects with the person, in a subject position, electromagnetic radiation in a frequency range of about 100 MHz to about 2 THz, from positions spaced from the subject position, the antenna assembly producing an image signal representative of the received radiation, the antenna assembly being adapted to operate selectively in a first mode to produce a first portion of the image signal, and in a second mode to produce a second portion of the image signal corresponding to a portion of the first portion of the image signal; and
a controller adapted to control operation of the antenna assembly, to produce from at least the first portion of the image signal first image data representative of a first image of at least a portion of the subject, and to produce from at least the second portion of the image signal, second image data representative of a second image corresponding to a portion of the first image, and to cause the antenna assembly to operate in the second mode in response to an indication associated with the second portion of the image signal determined from the first portion of the image signal.

22. The imaging system of claim 21, in which the processor is further adapted to determine whether the first image includes characteristics corresponding to an object on the person, and to produce the indication when the first image is determined to include characteristics of an object, with the second portion of the image signal corresponding to the portion of the image signal having the characteristics of an object.

23. The imaging system of claim 22, in which the antenna assembly further includes a second antenna apparatus adapted to produce the second portion of the image signal, and the processor is further adapted to operate the first antenna apparatus during operation of the antenna assembly in the first mode, and to operate the second antenna apparatus during operation of the antenna assembly in the second mode.

24. The imaging system of claim 23, in which the antenna assembly further includes a first moving mechanism adapted to move the first antenna apparatus relative to the subject position, and a second moving mechanism adapted to move the second antenna apparatus relative to the first moving mechanism.

25. The imaging system of claim 24, in which the first moving mechanism also is adapted to move the second antenna apparatus relative to the subject position.

26. The imaging system of claim 22, in which the processor is adapted to generate the first image data with picture elements having different levels of intensity, and to determine a correlation of the levels of intensity of at least one group of picture elements with the levels of intensity of a corresponding reference group of picture elements that are characteristic of an object.

27. The imaging system of claim 26, in which the processor is further adapted to identify as the second portion of the image signal at least a portion of the first image data corresponding to which there is at least a threshold correlation of the levels of intensity of the at least one group of picture elements.

28. The imaging system of claim 27, in which the processor is further adapted to determine the correlation of the levels of intensity of the at least one group of picture elements by determining a correlation value for a given picture element as a function of the intensity level of one or more other picture elements.

29. The imaging system of claim 28, in which the processor is further adapted to determine the correlation value for a given picture element by determining a correlation value for the given picture element that is based on the intensity levels of a group of associated picture elements arranged relative to the given picture element.

30. The imaging system of claim 29, in which the processor is further adapted to determine the correlation value for the given picture element by modifying the original intensity level of each picture element of the group of associated picture elements, by an amount related to the position of the picture element in the group relative to the given element, and combining the modified intensity levels.

31. The imaging system of claim 30, in which the processor is adapted to modify the original intensity level by associating a factor with each picture-element in the group of picture-elements, with at least two of the factors being different, and multiplying the original intensity level of each picture element in the group by the factor associated with the picture element.

32. The imaging system of claim 31, in which the group of adjacent picture-element positions includes a center picture-element position, with the factor associated with the center picture-element position having a value greater than the value of the other factors.

33. The imaging system of claim 32, in which the group of adjacent picture-element positions form at least one row of picture-element positions, with the factors of the picture-element positions in the at least one row including at least one positive value and at least one negative value.

34. The imaging system of claim 33, in which the group of adjacent picture-element positions form a grid of columns and rows of picture-element positions, with the factors of the picture-element positions in each row and column alternating between positive and negative values.

35. A method of surveilling a subject, the subject including a person and any discernabie objects with the person, the method comprising:
transmitting toward the subject in a subject position, electromagnetic radiation in a frequency range of about 100 MHz to about 2 THz, from positions spaced from the subject position;
receiving from the subject electromagnetic radiation emitted from the subject in response to the transmitted electromagnetic radiation;
producing an image signal representative of the received radiation; and
producing from the image signal, first image data corresponding to a first image of at least a portion of the subject having a first resolution, and second image data corresponding to a second image of at least a portion of the subject having a second resolution greater than the first resolution.

36. The method of claim 35, further comprising determining whether at least a portion of the first image data corresponding to the first image includes characteristics corresponding to an object on the person, and when the first image data corresponding to the first image is determined to include characteristics corresponding to an object, producing the second image data corresponding to a portion of the image signal associated with the first image data including characteristics corresponding to an object.

37. The method of claim 36, in which transmitting radiation includes transmitting radiation on a first antenna apparatus and transmitting radiation from a second antenna apparatus; receiving radiation includes receiving radiation on the first antenna apparatus in response to radiation transmitted on the first antenna apparatus, and receiving radiation on the second antenna apparatus in response to radiation transmitted on the second antenna apparatus; and producing an image signal includes producing the first portion of the image signal representative of the radiation received on the first antenna apparatus, and producing the second portion of the image signal representative of the radiation received on the second antenna apparatus.

38. The method of claim 37, further comprising moving the second antenna apparatus relative to the first moving mechanism.

39. The method of claim 38, further comprising supporting the second antenna apparatus relative to the first antenna apparatus, and moving the second antenna apparatus relative to the subject position by moving the first antenna apparatus.

40. The method of claim 36, in which generating first image data includes generating first image data having picture elements with different levels of intensity, and identifying at least a first portion of the first image data includes determining a correlation of the levels of intensity of at least one group of picture elements with the levels of intensity of a corresponding reference group of picture elements.

41. The method of claim 40, in which determining a correlation of the levels of intensity further includes identifying at least a portion of the first image data corresponding to which there is at least a threshold correlation of the levels of intensity of the picture elements in the at least one group of picture elements with the levels of intensity of the reference group of picture elements.

42. The method of claim 41, in which identifying at least a portion of the first image data includes determining a correlation value for a given picture element as a function of the intensity level of one or more other picture elements.

43. The method of claim 42, in which determining a correlation value for a given picture element includes determining a correlation value for the given picture element that is derived from the intensity levels of a group of associated picture elements arranged relative to the given picture element.

44. The method of claim 43, in which determining the correlation value for the given picture element derived from the intensity levels of an associated group of picture elements includes modifying the original intensity level of each picture element of the group of associated picture elements, by an amount related to the position of the picture element in the group relative to the given element, and combining the modified intensity levels.

45. The method of claim 44, in which modifying the original intensity level includes associating a factor with each picture-element in the group of picture-elements, with at least two of the factors being different, and multiplying the original intensity level of each picture element in the group by the factor associated with the picture element.

46. The method of claim 45, in which associating a factor includes associating a factor with each picture element in a group of adjacent picture-element positions including a center picture-element position, with the factor associated with the center picture-element position having a value greater than the value of the other factors.

47. The method of claim 46, in which associating a factor includes associating a factor with each picture element in a group of adjacent picture-element positions forming at least one row of picture-element positions, with the factors of the picture-element positions in the at least one row including at least one positive value and at least one negative value.

48. The method of claim 47, in which associating a factor includes associating a factor with each picture element in a group of adjacent picture-element positions forming a grid of columns and rows of picture-element positions, with the factors of the picture-element positions in each row and column alternating between positive and negative values.

49. The method of claim 35, in which producing second image data includes producing second image data corresponding to a second image that includes at least a portion of the first image.

50. The method of claim 49, in which the first and second image data includes picture elements each having a level of intensity, and producing second image data includes producing second image data with picture elements having levels of intensity based on levels of intensity of one or more corresponding picture elements in the first image data.

51. The method of claim 50, in which producing second image data includes producing second image data with picture elements having levels of intensity determined by interpolating picture elements in the first image data.

52. The method of claim 49, in which producing second image data includes producing second image data corresponding to a second image that is enlarged compared to the first image.

53. An imaging system comprising:
means for transmitting toward the subject in a subject position, electromagnetic radiation in a frequency range of about 100 MHz to about 2 THz, from positions spaced from the subject position;
means for receiving from the subject electromagnetic radiation emitted from the subject in response to the transmitted electromagnetic radiation;
means for producing an image signal representative of the received radiation; and
means for producing from at least a first portion of the image signal, first image data corresponding to a first image of at least a portion of the subject having a first resolution; and
means for producing from at least a second portion of the image signal, second image data corresponding to a second image of at least a portion of the subject having a second resolution greater than the first resolution.

54. The imaging system of claim 53, further comprising means for determining whether the first image data corresponding to the first image includes characteristics corresponding to an object on the person, and in which the means for producing the second image data is further for producing the second image data from a portion of the image signal associated with the first image data including characteristics corresponding to an object.

55. The imaging system of claim 54, in which the means for transmitting radiation is further for transmitting radiation on a first antenna apparatus and transmitting radiation from a second antenna apparatus; the means for receiving radiation is further for receiving radiation on the first antenna apparatus in response to radiation transmitted on the first antenna apparatus, and receiving radiation on the second antenna apparatus in response to radiation transmitted on the second antenna apparatus; and the means for producing an image signal is further for producing the first portion of the image signal representative of the radiation received on the first antenna apparatus, and producing the second portion of the image signal representative of the radiation received on the second antenna apparatus.

56. One or more storage media having embodied therein a program of commands adapted to be executed by a computer processor to:
receive an image signal generated in response to an interrogation of a subject, including a person and any objects carried by the person, with electromagnetic radiation in a range of about 100 MHz to about 2 THz;
produce from at least a first portion of the image signal, image data corresponding to a first image of at least a portion of the subject; and
produce from at least a second portion of the image signal, image data corresponding to a second image of at least a portion the first image.

57. The storage media of claim 56, in which the program embodied therein is further adapted to be executed by a computer processor to determine whether the image data corresponding to the first image includes characteristics corresponding to an object on the person, and when the image data corresponding to the first image is determined to include characteristics corresponding to an object, produce the image data corresponding to a second image from a portion of the image signal associated with the image data including characteristics corresponding to an object.

58. The storage media of claim 57, in which the program embodied therein is further adapted to be executed by a computer processor to produce from at least a first portion of the image signal, image data having picture elements with different levels of intensity, and determine a correlation of the levels of intensity of at least one group of picture elements with the levels of intensity of a corresponding reference group of picture elements having intensity levels corresponding to an object.

* * * * *